April 29, 1941.  T. V. BUCKWALTER  2,239,875
CRANKPIN BEARING
Filed Feb. 1, 1937   2 Sheets-Sheet 1

INVENTOR:
Tracy V. Buckwalter
HIS ATTORNEYS

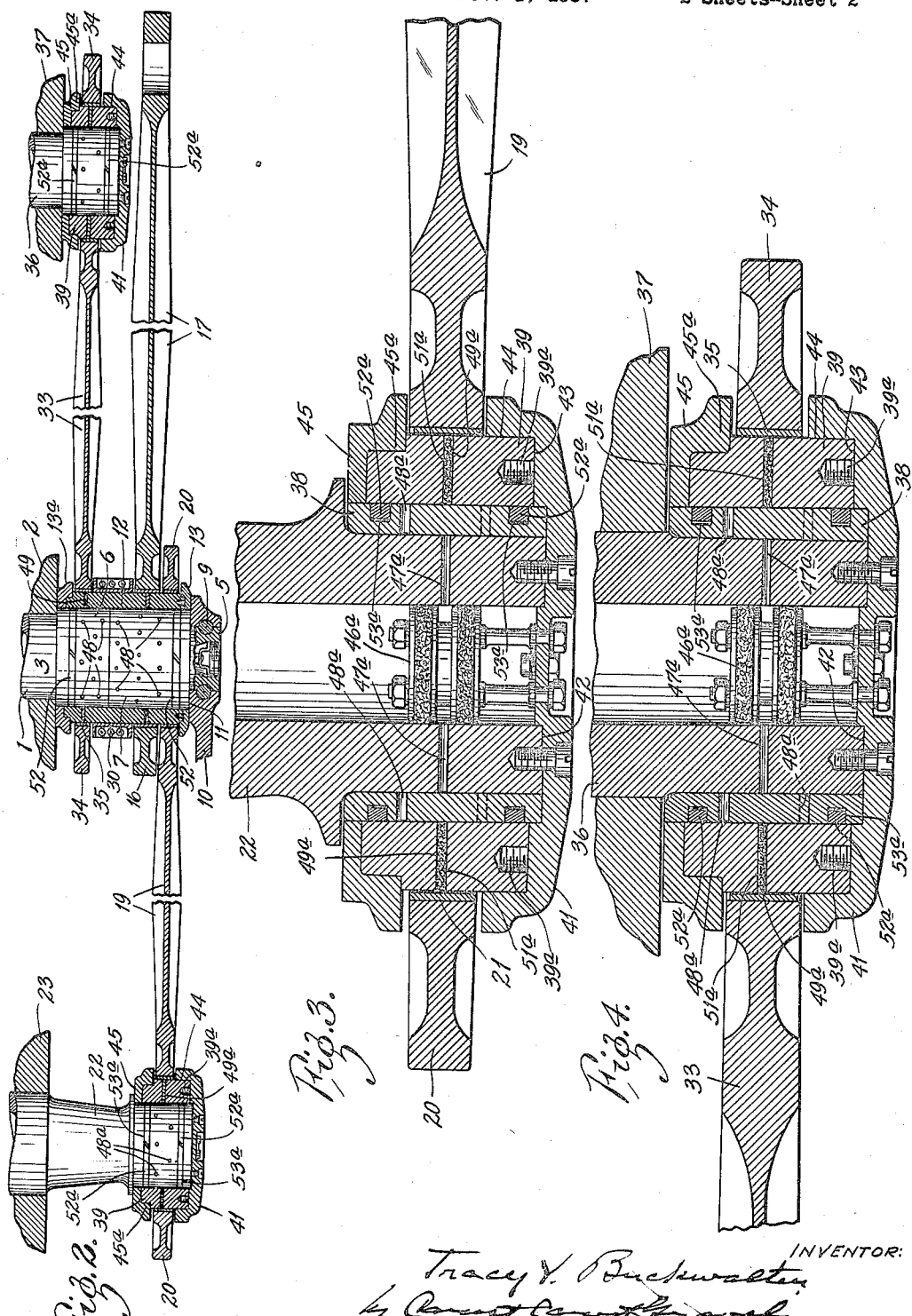

Patented Apr. 29, 1941

2,239,875

UNITED STATES PATENT OFFICE 2,239,875

CRANKPIN BEARING

Tracy V. Buckwalter, Canton, Ohio, assignor to The Timken Roller Bearing Company, Canton, Ohio, a corporation of Ohio Application February 1, 1937, Serial No. 123,373

5 Claims. (Cl. 308—37)

My invention relates to bearings for locomotive and other crankpins and is an improvement of my copending application Serial No. 110,826 filed November 14, 1936, for patent for Crankpin bearing now Patent No. 2,148,149. It has for its principal object a plain bearing arrangement for such crankpins which has many of the advantages of the roller bearing crankpin construction of my Patent No. 1,951,126. Other objects are strength and simplicity of construction, easy assembly and disassembly of the bearings, adequate lubrication and accommodation of the cocking of drive rods which necessarily occurs in locomotive service. The invention consists in the crankpin bearing and in the parts and combinations and arrangements of parts hereinafter described and claimed.

In the accompanying drawings—

Fig. 2 is a horizontal sectional view through a plurality of crankpin bearings and drive rods;

Fig. 3 is a sectional view of the rear wheel bearing; and

Fig. 4 is a sectional view of the front wheel bearing.

Figure 1:
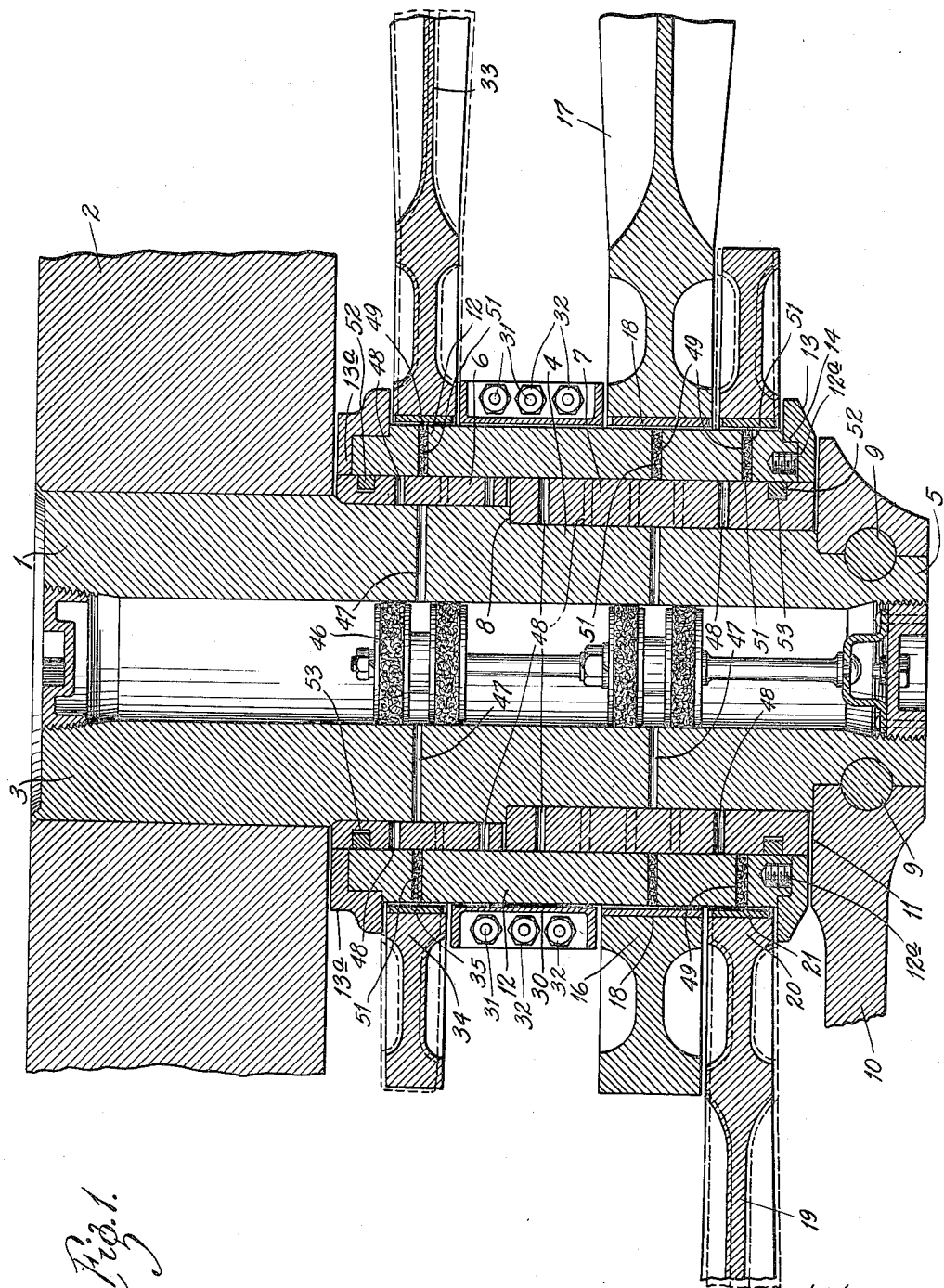
Fig. 1 is a sectional view of a main crankpin bearing embodying my invention, together with portions of the locomotive drive rods.

In Fig. 1 is illustrated the hollow main crankpin 1 of a locomotive drive wheel 2. The innermost portion 3 of said crankpin, that is the portion adjacent to the wheel, is of larger outside diameter than the body portion 4 outwardly thereof and the outermost end portion 5 is further reduced in diameter.

Rotatably mounted on the enlarged innermost portion 3 of the crankpin 1, adjacent to the wheel hub, is a plain bearing, preferably a floating bushing or sleeve 6 of bronze or other bearing metal. Rotatably mounted on the reduced body portion 4 of the crank pin adjacent to said innermost portion 3 is a second floating bushing or bearing sleeve 7, also of bronze or other suitable bearing metal, whose outside diameter is the same as the outside diameter of the above mentioned bearing sleeve 6 and whose innermost end is seated against the shoulder 8 formed by the end of the enlarged innermost portion of the crankpin. Fixed on the outermost end portion 5 of the crankpin 1, as by dowel pins 9, is a securing member 10 in the form of a valve gear return crank which has a flat inner face 11 bearing against the outer end of the floating bronze bushing 7 and projecting radially therebeyond. Rotatable on the bushing 6 and the bushing 7 is a floating main bushing or sleeve 12, which is preferably of iron or steel or other hard, strong metal and is provided at its outer end with threaded holes 12a adapted to receive the threaded ends of pulling rods (not shown). This main bushing 12 is held in place by means of an abutment ring 13, which is mounted on the outermost end of the floating bushing 7 between the main bushing and the valve gear return crank 10, and an abutment ring 13a which is mounted on the innermost end of the floating bushing 6 between said main bushing and the drive wheel 2. The outer ring 13 has an inwardly projecting flange 14 around the periphery of its inner face, overlapping the reduced outer end of the main bushing 12. Said outermost ring is held in place by said securing member 10 which overlaps it. The inner ring 13a is likewise provided with a flange 14a that overlaps the reduced inner end of the main bushing.

Mounted on the main bushing 12 by means of a circular eye 16 is the main drive rod 17, the eye preferably having a liner ring 18 of bronze or other suitable bearing metal. The main rod 17 extends forwardly to the cross head of the locomotive (not shown) by which it is driven and to which it is connected in any suitable way.

Similarly mounted on the main bushing 12 outwardly of the main rod 17 is a rear side rod 19 having an eye 20 lined with a bearing ring 21. Said rear side rod 19 extends rearwardly to the crankpin 22 of the next adjacent drive wheel 23 where it is mounted on said pin by means of another eye 20 lined with a bearing ring 21.

Similarly mounted on the main bushing 12 adjacent to the inner ring 16a is a front side rod 33 having an eye 34 provided with a bearing ring 35. Said front side rod extends forwardly to the crankpin 36 of the next adjacent locomotive drive wheel 37 and is mounted on said pin by means of another eye 34 provided with a bearing ring 35. Mounted on the main bushing 12 between the eye 16 of the main rod 17 and the eye 34 of the front side rod 33 is a channel-shaped split spacer member 30 secured together by bolts 31 and nuts 32.

As shown in the drawings, the bearings for the crankpins 22 and 36 are plain bearings of the same construction. Each of these crankpin bearings comprises a bushing 38 of bronze or other material rotatably mounted on the crankpin, and a main bushing 39 of cast iron or other hard metal rotatably mounted on said bronze bushing and rotatable in the bearing ring in the eye of the side rod cooperating with said pin. The main bushing 39 is provided at its outer end with threaded holes 39a, similar to those in the main bushing 12, adapted to receive the threaded ends of pulling rods (not shown). A cap 41 secured to the end of the crankpin has an annular zone 42 engaging the end of the floating bushing 38, an inwardly stepped annular zone 43 that overlaps said bushing and that engages the outer end of the main bushing 39, and an inwardly stepped peripheral zone 44 that overlaps said main bushing and serves as a stop for the side rod mounted thereon. A ring 45 is mounted on the innermost end of the floating bushing 38 and has an axially offset peripheral flange 45a seated on the reduced inner end of the main bushing 39 that serves as a stop for the other side of said side rod.

As shown in the drawings, the rods are loosely mounted on the main bushings of the crankpins and the abutment members for the sides of said rods are spaced apart sufficiently to permit relative movement of said rods and bushings axially of the latter. Thus, cocking of the rods, incident to locomotive service, is accommodated. The dotted lines in the drawings show the rods in cocked position.

Mounted in the bore of the main crankpin 1 is a lubricating device 46, preferably of the type disclosed in my Patent No. 2,040,803. The crankpin 1 is provided with radial passageways 47 therethrough and the floating bushing 6 and the floating bushing 7 are also provided with a plurality of radial passageways 48 therethrough. The main bushing 12 is provided with radial passageways 49 whose outer ends open into the several bearing liners in the eyes of the rods. The radial passageways 49 in said bushing are preferably provided with suitable wick members 51. Thus, lubricant from the crankpin bore passes through the passageways 47 of the crankpin, the passageways 48 of the floating bushings and the passageways 49 of the main bushing into the annular peripheral passageways 50 where it is distributed over the bronze liner members. The passageways 47 of the crank pin are not in direct alinement with those 48 of the floating bushings and the passageways 48 of the floating bushings are not in direct alinement with those 49 of the main bushing, so that some of the oil finds its way into the spaces between the crankpin 1 and the floating bushings 6 and 7 and the space between the floating bushings, and the main bushing 12. Thus all moving parts are adequately lubricated, the flow of lubricant being controlled by lubricating device 46 in the crankpin. To prevent escape of lubricant, split rings 52, similar to the commonly used piston rings, are seated in annular grooves 53 near the ends of the floating bushings 6 and 7, bearing against the inner periphery of the main bushing 12. Thus, outward escape of the lubricant at these points is prevented and an internal pressure is built up that forces the lubricant to spread along the several bearing surfaces.

Mounted in the bore of each of the crankpins 22 and 36 is a lubricating device 46a similar to the lubricating device 46 hereinbefore described. Lubricant from said bore passes through radial passageways 47a in said crankpin, thence through radial passageways 48a in the floating bushing 38, and thence through radial passageways 49a in the main bushing 39a into the space between said main bushing and the bronze liner or bearing ring in the cooperating eye of the side rod. The passageways 49a are provided with suitable wick members 51a. Escape of lubricant is prevented by split rings 52a seated in annular grooves 53a near the ends of the floating bushing 38.

It will be seen that the above bearing is one that can be used on stepped crankpins similar to those now commonly in use and that it can be easily substituted for the roller bearing arrangement of my Patent No. 1,951,126. Cocking of the main rod and side rods, which is inevitable in service, is accommodated without destroying the full surface bearing of the crankpins on the floating bushings and the main bushings. The use of two floating bushings permits the relative movement between them that is likely to occur due to the larger load on the larger floating bushing. The load from piston to crankpins is largely transmitted through the main bushings instead of passing through the bearings and the main bushing is preferably made of iron or steel or other strong material so as to have greater load carrying and transmitting capacity. The floating bushings and the main bushing of each crankpin bearing may be quickly and easily removed and re-serviced without disturbing the rods merely by removing the ring or cap at the outer end of the main bushing; and the threaded holes in the outer end of said main bushing afford means for attaching a pulling device thereto.

It is obvious that bearings of the kind above described may be placed on the crankpins of locomotive drive arrangements of all kinds, from a simple single drive wheel and single drive rod arrangement up to the largest multiple drive wheel arrangements. Likewise, the plain bearing arrangement may be used on all crankpins or on the main crankpin and one or more of the other crankpins, while still other crankpins have roller bearings of the kind shown in my said Patent No. 1,951,126. Obviously, numerous changes may be made without departing from the invention and I do not wish to be limited to the precise construction shown.

What I claim is:

1. A locomotive rod bearing comprising a driving wheel having a crankpin, a floating bushing thereon, a floating main bushing on said first mentioned bushing, a rod having an opening rotatably receiving said main bushing, and abutment means for the sides of said rod, the abutment means for the inner side of said rod comprising an annular abutment member mounted on the inner end of said first mentioned bushing between said wheel and said rod but unsecured to said main bushing, whereby said main bushing is insertable in and removable from said bearing without removing said rod or said annular abutment member.

2. A locomotive rod bearing comprising a driving wheel having a crankpin, a floating bushing thereon, a floating main bushing on said first mentioned bushing, and a rod having an opening rotatably receiving said main bushing, and an annular abutment member for the inner side of said rod sleeved on the inner end of said first mentioned bushing opposite to but entirely unsecured to the inner end of said main bushing, whereby said main bushing is insertable in and removable from said bearing independently of said rod and said annular abutment member.

3. A locomotive rod bearing comprising a driving wheel having a crankpin with an outer end portion of smaller outside diameter than its inner end portion, separate floating bushings on the respective diameters of said pin and having the same outside diameter, a floating main bushing on said first mentioned bushing, a rod having an opening rotatably receiving said main bushing, and a ring mounted on the innermost of said first mentioned bushings and having a portion overlapping the inner end portion of said main bushing and forming an abutment for the inner side of said rod, said ring being entirely unsecured to said main bushing, whereby said main bushing is adapted to be inserted in and removed from said opening through the outer end thereof.

4. A locomotive rod bearing comprising a driving wheel having a crankpin, a floating bushing thereon, a floating main bushing on said first mentioned bushing, a rod having an opening rotatably receiving said main bushing, and a ring mounted on said first mentioned bushing between said wheel and said rod and having a portion overlapping the inner end of said main bushing and forming an abutment for the inner side of said rod, said ring being unsecured to said main bushing, whereby said main bushing is insertable in and removable from said bearing independently of said rod, the outer end of said main bushing being provided with openings adapted for cooperation with a suitable pulling device, a retaining member removably secured to the outer end of said crankpin, and a ring mounted around said crankpin between said rod and said retaining member and having a portion covering the openings in the outer end of said main bushing and a portion forming an abutment for the outer side of said rod.

5. A locomotive rod bearing comprising a driving wheel having a crankpin with an outer end portion of smaller outside diameter than its inner end portion, separate floating bushings on the respective diameters of said pin and having the same outside diameter, a floating main bushing on said first mentioned bushings, a rod having an opening rotatably receiving said main bushing, a ring mounted on the innermost of said first mentioned bushings and having a portion overlapping but unsecured to the inner end of said main bushing and constituting an abutment for the inner side of said rod, a member mounted on the outermost of said first mentioned bushings and having a portion overlapping but unsecured to the outer end of said main bushing and constituting an abutment for the outer side of said rod, and a member fixed to the outer end of said crankpin for holding said bushings, said rods and said abutment ring and member in place.

TRACY V. BUCKWALTER.